US010434706B2

(12) United States Patent
Robeson et al.

(10) Patent No.: US 10,434,706 B2
(45) Date of Patent: Oct. 8, 2019

(54) CONTINUOUS THREE DIMENSIONAL FABRICATION FROM IMMISCIBLE LIQUIDS

(71) Applicant: Carbon, Inc., Redwood City, CA (US)

(72) Inventors: Lloyd M. Robeson, Macungie, PA (US); Edward T. Samulski, Chapel Hill, NC (US); Alexander Ermoshkin, Pittsboro, NC (US); Joseph M. DeSimone, Monte Sereno, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 16/289,991

(22) Filed: Mar. 1, 2019

(65) Prior Publication Data
US 2019/0193326 A1 Jun. 27, 2019

Related U.S. Application Data

(62) Division of application No. 15/302,843, filed as application No. PCT/US2015/026613 on Apr. 20, 2015, now Pat. No. 10,259,171.
(Continued)

(51) Int. Cl.
B29C 64/124 (2017.01)
B29C 64/20 (2017.01)
(Continued)

(52) U.S. Cl.
CPC .......... B29C 64/124 (2017.08); B29C 64/129 (2017.08); B29C 64/20 (2017.08);
(Continued)

(58) Field of Classification Search
CPC combination set(s) only.
See application file for complete search history.

(56) References Cited

U.S. PATENT DOCUMENTS 5,143,663 A * 9/1992 Leyden ................. B29C 64/135
118/423
5,236,637 A 8/1993 Hull
(Continued)

FOREIGN PATENT DOCUMENTS

EP 0403146 10/1991
WO 2014/126837 8/2014

OTHER PUBLICATIONS

Lee JB et al. Wetting transition characteristics on microstructured hydrophobic surfaces. Materials Transactions. Jul. 2010; 51(9): 1709-1711.
(Continued)

Primary Examiner — Michael P. Rodriguez
(74) Attorney, Agent, or Firm — Myers Bigel, P.A.

(57) ABSTRACT

A method of forming a three-dimensional object is carried out by: providing a carrier and a pool of immiscible liquid, the pool having a liquid build surface, the carrier and the liquid build surface defining a build region therebetween; filling the build region with a polymerizable liquid, wherein the immiscible liquid is immiscible with the polymerizable liquid (in some embodiments wherein the immiscible liquid has a density greater than the polymerizable liquid); irradiating the build region through at least a portion of the pool of immiscible liquid to form a solid polymer from the polymerizable liquid and advancing the carrier away from the liquid build surface to form the three-dimensional object comprised of the solid polymer from the polymerizable liquid. Optionally, but in some embodiments preferably, the method is carried out while also continuously maintaining a gradient of polymerization zone between the liquid build surface and the solid polymer and in contact with each thereof, the gradient of polymerization zone comprising the polymerizable liquid in partially cured form.

17 Claims, 2 Drawing Sheets

Related U.S. Application Data

(60) Provisional application No. 61/984,099, filed on Apr. 25, 2014.

(51) Int. Cl.
*B33Y 30/00* (2015.01)
*B33Y 10/00* (2015.01)
*B33Y 70/00* (2015.01)
*B29C 64/129* (2017.01)

(52) U.S. Cl.
CPC .............. *B33Y 10/00* (2014.12); *B33Y 30/00* (2014.12); *B33Y 70/00* (2014.12)

(56) References Cited

U.S. PATENT DOCUMENTS

| | | | |
|---|---|---|---|
| 5,352,714 | A | 10/1994 | Lai et al. |
| 5,445,669 | A | 8/1995 | Nakabayashi et al. |
| 5,573,721 | A * | 11/1996 | Gillette .................. B29C 41/12 264/401 |
| 6,528,465 | B1 | 3/2003 | Cantoro |
| 7,347,938 | B2 | 3/2008 | Schneider et al. |
| 7,438,846 | B2 | 10/2008 | John |
| 7,596,222 | B2 | 9/2009 | Jonas et al. |
| 9,095,558 | B2 | 8/2015 | Mayes et al. |
| 2013/0292862 | A1 | 11/2013 | Joyce |
| 2013/0295212 | A1 | 11/2013 | Chen et al. |
| 2015/0072293 | A1* | 3/2015 | DeSimone ............ B33Y 10/00 430/322 |
| 2016/0200052 | A1 | 7/2016 | Moore et al. |
| 2017/0129167 | A1 | 5/2017 | Castanon |

OTHER PUBLICATIONS

Pan Y et al. A fast mask projection stereolithography process for fabricating digital model in minutes. Journal of Manufacturing Science and Engineering. Oct. 2012; 134: 051011-01 to 051011-09.

Tumbleston J et al. Continuous liquid interface production of 3D objects. Science. Mar. 16, 2015; 347: 1345-1352. Accepted Feb. 3, 2015.

International Search Report and Written Opinion, PCT/US2015/026613, dated Jul. 30, 2015.

Morelli, Dean. Third Party Observation Regardeding WIPO Patent Application WO2015164234A1 and Others Regarding Continuous Liquid Interphase Printing (CLIP). Aug. 22, 2016, 33 pp. PCT Third Party Observation, PCT/US2015/026613, mailed Aug. 26, 2016.

3D printer and 3D printing news. Peachy printer—the world's first $100 3D printer. ww.3Ders.org, retrieved Apr. 6, 2015, 14 pp.

Morelli, Dean. Protest to Canadian Patent Applications by Joseph DeSimone et al. Regarding Continuous Liquid Interphase Printing. Canadian patent applications CA2898098A1, CA 2898103A1, and CA2898106A1. Dec. 31, 2015. Canadian Intellectual Property Office, 37 pp.

* cited by examiner

CONTINUOUS THREE DIMENSIONAL FABRICATION FROM IMMISCIBLE LIQUIDS

RELATED APPLICATIONS

This application is a divisional of U.S. application Ser. No. 15/302,843, which is a national stage of PCT/US2015/026613, filed Apr. 20, 2015, which claims the benefit of U.S. Provisional Patent Application Ser. No. 61/984,099, filed Apr. 25, 2014, the disclosures of which are incorporated by reference herein in their entireties.

FIELD OF THE INVENTION

The present invention concerns methods and apparatus for the fabrication of solid three-dimensional objects in a bottom-up fashion from an immiscible liquid layer or pool.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An early example of such a technique is given in Hull, U.S. Pat. No. 5,236,637, at FIG. 3. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction must be separated from the bottom plate in the fabrication well. An early example of such a technique is given in Hull, U.S. Pat. No. 5,236,637, at FIG. 4, where the polymerizable liquid is floated on top of a non-wetting immiscible liquid layer. Such techniques have not, however, been commercialized, and dramatically different techniques for "bottom up" fabrication have been implemented instead. For example, in U.S. Pat. No. 7,438,846, an elastic separation layer is used to achieve "non-destructive" separation of solidified material at the bottom construction plane. Other approaches, such as the B9Creator™ 3-dimensional printer marketed by B9Creations of Deadwood, S. Dak., USA, employ a sliding build plate. See, e.g., M. Joyce, US Patent App. 2013/0292862 and Y. Chen et al., US Patent App. 2013/0295212 (both Nov. 7, 2013); see also Y. Pan et al., *J. Manufacturing Sci. and Eng.* 134, 051011-1 (October 2012). Such approaches introduce a mechanical step that may complicate the apparatus, slow the method, and/or potentially distort the end product. Accordingly, there is a need for alternate methods and apparatus for three-dimensional fabrication that can obviate the need for mechanical separation steps in "bottom-up" fabrication.

SUMMARY OF THE INVENTION

A first aspect of the invention is a method of forming a three-dimensional object, comprising the steps of:

providing a carrier and a pool of immiscible liquid, the pool having a liquid build surface, the carrier and the liquid build surface defining a build region therebetween;

filling the build region with a polymerizable liquid, wherein the immiscible liquid is immiscible with the polymerizable liquid (e.g. wherein the immiscible liquid has a density greater than the polymerizable liquid); and irradiating (e.g., with patterned irradiation, where the pattern changes over time) the build region through at least a portion of the liquid to form a solid polymer from the polymerizable liquid while (optionally but preferably) concurrently advancing the carrier away from the liquid build surface to form the three-dimensional object comprised of the solid polymer from the polymerizable liquid (or in other embodiments, carrying out irradiating advancing in separate, step-wise fashion, so that the three-dimensional object is constructed in a layer-by-layer fashion).

In some embodiments, the method comprises, also concurrently with the irradiating step, continuously maintaining a gradient of polymerization zone (sometimes referred to as an "active surface" as discussed below) between the liquid build surface and the solid polymer and in contact with each thereof, the gradient of polymerization zone comprising the polymerizable liquid in partially cured form. In other embodiments, the three-dimensional object may be formed in a layer-by-layer manner. The first is in some embodiments referred to as "CLIP" for "continuous liquid interface production," "continuous liquid interphase printing," or other variants thereof (See, e.g., J. Desimone, A. Ermoshkin, N. Ermoshkin, and E. Samulski, *Continuous Liquid Interphase Printing*, PCT Application Pub. No. WO 2014/126837 (21 Aug. 2014); see also J. Tumbleston et al., *Continuous liquid interface production of 3d objects*, Science 347, 1349-1352 (published online 16 Mar. 2015)).

A further aspect of the invention is a liquid system useful for forming a three-dimensional object, comprising, consisting of or consisting essentially of:

(a) from 1, 2 or 5 percent to 90, 95 or 99.9 percent by weight of a polymerizable liquid from which a three-dimensional object may be formed; and (b) from 0.1, 5, or 10 percent to 95, 97 or 99 percent by weight of an immiscible liquid, wherein the immiscible liquid: (i) has a density greater than the polymerizable liquid, (ii) is immiscible with the polymerizable liquid, and (iii) is wettable with the polymerizable liquid. Ingredients such as surfactants, wetting agents, viscosity-enhancing agents, pigments, and particles may optionally be included in either or both of the polymerizable liquid or immiscible liquid, as discussed further below.

In some embodiments, the irradiating step is carried out under conditions in which the immiscible liquid is wettable with or sufficiently wettable with the polymerizable liquid (e.g., such that a continuous film or layer of the polymerizable liquid spreads on the surface of the immiscible liquid; and/or, under conditions in which the contact angle of the polymerizable liquid on the immiscible liquid is not more than 60, 90, 120, or 150 degrees).

In some embodiments, the immiscible liquid is a single phase solution.

In some embodiments, the immiscible liquid is an aqueous liquid.

In some embodiments, the immiscible liquid has a density of at least 1.13, 1.15, or 1.2 grams per cubic centimeter.

In some embodiments, the irradiating step is carried out under conditions in which the viscosity of the polymerizable liquid is not greater than the viscosity of the immiscible liquid.

In some embodiments, the polymerizable liquid comprises a free radical polymerizable liquid or an acid catalyzed polymerizable liquid.

In some embodiments, either or both of the immiscible liquid and the polymerizable liquid further comprises a wetting agent (e.g., a surfactant).

In some embodiments, the immiscible liquid further comprises a density-enhancing agent (e.g., a salt).

In some embodiments, the immiscible liquid further comprises a viscosity-enhancing agent (e.g., sugars, polyols, water soluble polymers, etc.).

In some embodiments, the method further comprises the step of cooling the pool (e.g., to dissipate heat of polymerization created by irradiating polymerizable liquid in the build region, and/or stabilize the pool). In some embodiments, the pool is at least partially frozen.

In some embodiments, the method further comprises the step of heating the pool (e.g., to reduce the viscosity of the polymerizable liquid, for example to enhance the rate or speed of forming the three dimensional object).

In some embodiments of the method, the filling step is carried out by forcing the polymerizable liquid into the build region under pressure (e.g., to enhance the rate or speed of forming the three dimensional object).

Continuous processes for producing a three-dimensional object are suggested at some length with respect to "top down" techniques in U.S. Pat. No. 7,892,474, but this reference does not explain how they may be implemented in "bottom up" systems in a manner non-destructive to the article being produced.

Non-limiting examples and specific embodiments of the present invention are explained in greater detail in the drawings herein and the specification set forth below. The disclosure of all United States Patent references cited herein are to be incorporated herein by reference in their entirety.

DETAILED DESCRIPTION OF ILLUSTRATIVE EMBODIMENTS

Figure 1:
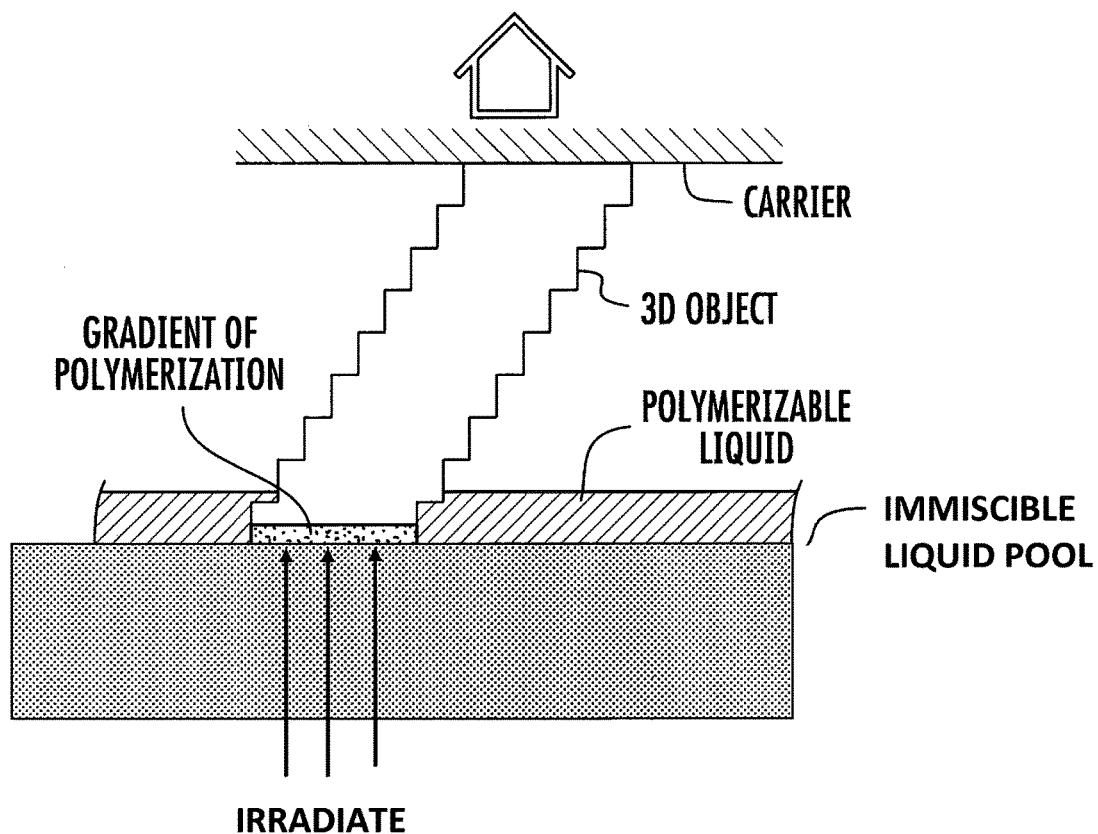
FIG. 1 is a schematic illustration of one embodiment of a method of the present invention.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Polymerizable Liquids.

Any suitable polymerizable liquid can be used to enable the present invention. The liquid (sometimes also referred to as "liquid resin" "ink," or simply "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cure site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Acid Catalyzed Polymerizable Liquids.

While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers contain groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocycloic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluorophosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also *Photoacid Generator Selection Guide for the electronics industry and energy curable coatings* (BASF 2010).

Hydrogels.

In some embodiments suitable resins includes photocurable hydrogels like poly(ethylene glycols) (PEG) and gelatins. PEG hydrogels have been used to deliver a variety of biologicals, including Growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable Silicone Resins.

A suitable resin includes photocurable silicones. UV cure silicone rubber, such as Siliopren™ UV Cure Silicone Rubber can be used as can LOCTITE™ Cure Silicone adhesives sealants. Applications include optical instruments, medical and surgical equipment, exterior lighting and enclosures, electrical connectors/sensors, fiber optics and gaskets.

Biodegradable Resins.

Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable Polyurethanes.

A particularly useful resin is photocurable polyurethanes. A photopolymerizable polyurethane composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High Performance Resins.

In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, and fluoroenone initiators (including derivatives thereof), to initiate cross-linking on irradiation, as discussed further below.

Additional Example Resins.

Particularly useful resins for dental applications include EnvisionTEC's Clear Guide, EnvisionTEC's E-Denstone Material. Particularly useful resins for hearing aid industries include EnvisionTEC's e-Shell 300 Series of resins. Particularly useful resins include EnvisionTEC's H™ 1401V High Temperature Mold Material for use directly with vulcanized rubber in molding/casting applications. A particularly useful material for making tough and stiff parts includes EnvisionTEC's RC31 resin. A particulary useful resin for investment casting applications includes EnvisionTEC's Easy Cast EC500.

Sol-Gel Polymerizable Liquids.

In some embodiments, the polymerizable liquid may comprise a sol solution, or acid-catalyzed sol. Such solutions generally comprise a metal alkoxide including silicon and titanium alkoxides such as silicon tetraethoxide (tetraethyl ortholsilicate; TEOS) in a suitable solvent. Products with a range of different properties can be so generated, from rubbery materials (e.g., using silane-terminated silicone rubber oligomers) to very rigid materials (glass using only TEOS), and properties in between using TEOS combinations with various silane-terminated oligomers. Additional ingredients such as dyes and dopants may be included in the sol solution as as is known in the art, and post-polymerization firing steps may be include as is known in the art. see, e.g., U.S. Pat. Nos. 4,765,818; 7,709,597; 7,108,947; 8,242, 299; 8,147,918; 7,368,514; etc. Where the sol solution is acid polymerized, suitable inhibitors include bases such as ammonia as discussed further below.

Additional Resin Ingredients.

The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Inhibitors of Polymerization.

In some embodiments, the immiscible liquid may have a polymerization inhibitor dissolved or solubilized therein. Such inhibitors may be used to establish a "dead zone" within the gradient of polymerization closest to the immiscible liquid, where polymerization is completely inhibited, with polymerization progressively more complete in the regions of the gradient furthest from the immiscible liquid. Inhibitors or polymerization inhibitors for use in the present invention may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

In addition to or in alternative to the foregoing, the polymerization inhibitor (e.g., for inhibiting free-radically polymerized materials) may be an organic compound, examples of which include, but are not limited to, monomethyl ether hydroquinone, bis-(1-octyloxy-2,2,6,6-tetramethyl-4-piperidinyl)sebacate, 1-(methyl)-8-(1,2,2,6,6-pentamethyl-4-piperidinyl)sebacate, aluminum-nitrosophenylhydroxylamine, butylated hydroxytoluene, phenothiazine, hydroquinone, methoxyquinone, 1,4-phenylenediamine, p-anisole, 2,6-di-tert-butyl-4-methylphenol (BHT), methylhydroquinone, ethylhydroquinone, methoxyhydroquinone, ethoxyhydroquinone, monomethylether hydroquinone, propylhydroquinone, propoxyhydroquinone, tert-butylhydroquinone, n-butylhydroquinone, derivatives thereof, and combinations thereof. See, e.g., U.S. Pat. Nos. 8,389,593 and 8,017,193.

Polymerizable Liquids Carrying Live Cells.

In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556, 490; 6,602,975; 5,836,313; etc.

2. Apparatus.

Figure 2:
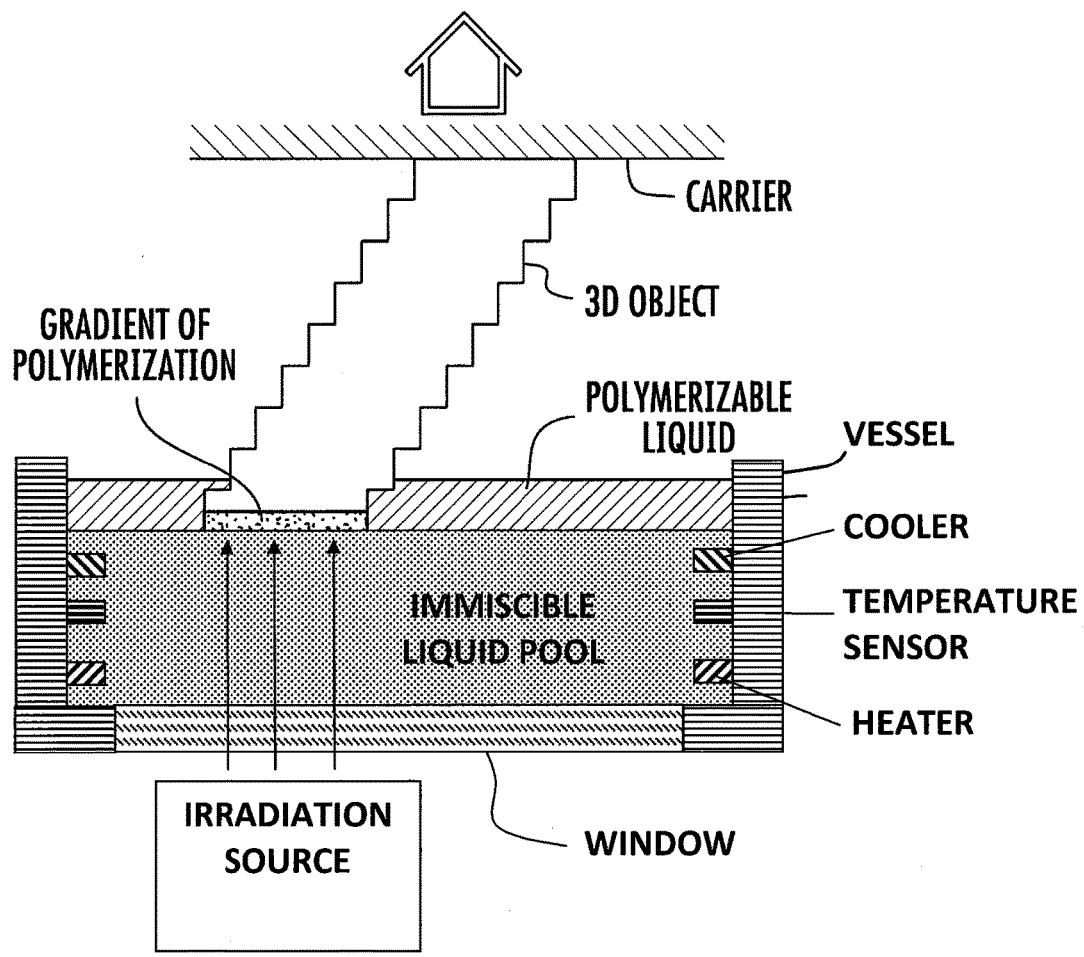
FIG. 2 is a side schematic view of one embodiment of an apparatus useful for carrying out the method of the present invention.

The methods of the present invention can be implemented with a variety of different apparatus. In the simplest embodiment, an apparatus as described in U.S. Pat. No. 5,236,637 to Hull at FIG. 4 therein may be used. More preferably, however, an apparatus as shown in FIG. 2 herein is employed. In brief overview, such an apparatus includes a vessel for containing an immiscible liquid, with a polymerizable liquid floating on top of the immiscible liquid (the density of the polymerizable liquid being less than the density of the immiscible liquid). A window (e.g., glass) is positioned at the bottom of the vessel, through which an irradiation source may irradiate the build region. A carrier is positioned over the vessel which gradually and progressively advances the growing three-dimensional object up and out of the polymerizable liquid. At least one temperature sensor or thermocouple is positioned in the vessel, along with at least one heater and/or cooler (e.g., a Peltier cooler), all positioned to contact the immiscible liquid. A controller (e.g., a computer with appropriate interface and program) may be provided (not shown), which operates the carrier, heater, and cooler, e.g., responsive to data such as current temperature of the immiscible liquid as determined by the temperature sensor. Additional and alternative features of the apparatus, and the operation thereof, are discussed further below.

Numerous variations on the apparatus described in FIG. 2 above can be employed. For example, pool depth in the apparatus may be varied from thin or shallow to deep, depending on factors such as the composition of the immiscible liquid, the structure of the apparatus, etc. For example, the pool depth may be desired to be sufficiently thick that the heat of polymerization at the reaction zone can be transferred into the pool of immiscible liquid. In some embodiments, the pool may have a depth of at least 1, 5 or 10 microns, up to 1, 5, or 10 millimeters, or more. In other embodiments, the pool may have a depth of at least 1, 5, or 10 millimeters, up to 10, 50 or 100 millimeters, or more.

While in the illustrated embodiments the pool is shown as a static or stationary pool, in other embodiments circulation of immiscible liquid may be provided through the pool, for example to cool the pool, or refresh oxygen content therein (e.g., of fluorinated fluids).

Irradiation may be through a window positioned at the bottom of the pool as illustrated above, through the side of the pool (e.g., aided by a mirror or mirror assembly within the pool), may be achieved with a light source positioned entirely within the pool, may be achieved with a fiber optic or light pipe having a terminus within the pool, etc.

Any suitable radiation source (or combination of sources) can be used in the apparatus, depending upon the particular resin employed, including electron beam and ionizing radiation sources. In a preferred embodiment the radiation source is an actinic radiation source, such as one or more light sources, and in particular one or more ultraviolet light sources. Any suitable light source can be used, such as incandescent lights, fluorescent lights, phosphorescent or luminescent lights, a laser, light-emitting diode, etc., including arrays thereof. The light source preferably includes a pattern-forming element operatively associated with a controller, as noted above. In some embodiments, the light source or pattern forming element comprises a digital (or deformable) micromirror device (DMD) with digital light processing (DLP), a spatial modulator (SLM), or a microelectromechanical system (MEMS) mirror array, a mask (aka a reticle), a silhouette, or a combination thereof. See, U.S. Pat. No. 7,902,526. Preferably the light source comprises a spatial light modulation array such as a liquid crystal light valve array or micromirror array or DMD (e.g., with an operatively associated digital light processor, typically in turn under the control of a suitable controller), configured to carry out exposure or irradiation of the polymerizable liquid without a mask, e.g., by maskless photolithography. See, e.g., U.S. Pat. Nos. 6,312,134; 6,248,509; 6,238,852; and 5,691,541.

While in some embodiments the carrier is mounted on an elevator to advance up and away from a stationary build plate, on other embodiments the converse arrangement may be used: That is, the carrier may be fixed and the build plate lowered to thereby advance the carrier away therefrom. Numerous different mechanical configurations will be apparent to those skilled in the art to achieve the same result, in all of which the build plate is "stationary" in the sense that no lateral (X or Y) movement is required to replenish the inhibitor thereon, or no elastic build plate that must be stretched and then rebound (with associated over-advance, and back-up of, the carrier) need be employed.

Depending on the choice of material from which the carrier is fabricated, and the choice of polymer or resin from which the article is made, adhesion of the article to the carrier may sometimes be insufficient to retain the article on the carrier through to completion of the finished article or "build." For example, an aluminum carrier may have lower adhesion than a poly(vinyl chloride) (or "PVC") carrier. Hence one solution is to employ a carrier comprising a PVC on the surface to which the article being fabricated is polymerized. If this promotes too great an adhesion to conveniently separate the finished part from the carrier, then any of a variety of techniques can be used to further secure the article to a less adhesive carrier, including but not limited to the application of adhesive tape such as "Greener Masking Tape for Basic Painting #2025 High adhesion" to further secure the article to the carrier during fabrication.

Soluble Sacrificial Layers.

In some embodiments, a soluble sacrificial layer or release layer may be established between the carrier and the three-dimensional object, so that that sacrificial layer may be subsequently solubilized to conveniently release the three-dimensional object from the carrier once fabrication is complete. Any suitable sacrificial layer, such as an adhesive, that may be coated or otherwise provided on the carrier may be employed, and any suitable solvent (e.g., polar and non-polar organic solvents, aqueous solvents, etc.) to solubilize the sacrificial release layer may be employed, though the sacrificial layer and its corresponding solvent should be chosen so that the particular material from which the three-dimensional object is formed is not itself unduly attacked or solubilized by that solvent. The sacrificial layer may be applied to the carrier by any suitable technique, such as spraying, dip coating, painting, etc. Examples of suitable materials for the soluble sacrificial release layer (and non-limiting examples of corresponding solvents) include but are not limited to: cyanoacrylate adhesive (acetone solvent); poly(vinylpyrrolidone) (water and/or isopropyl alcohol solvent); lacquers (acetone solvent); polyvinyl alcohol, polyacrylic acid, poly(methacrylic acid), polyacrylamide, polyalkylene oxides such as poly(ethylene oxide), sugars and saccharides such as sucrose and dextran (all water or aqueous solvents); etc. Lower surface energy solvents are in some embodiments particularly preferred.

In some embodiments of the invention, the actuator/drive and/or associated controller are configured to only advance the carrier away from the build region (e.g., is unidirectional), as discussed further below.

In some embodiments of the invention, the actuator/drive and/or associated controller are configured as a continuous drive (as opposed to a step-wise drive), as also discussed below.

3. Immiscible Liquids and Liquid Systems.

Immiscible Liquids.

While Hull et al. suggests "non-wetting" liquids as the immiscible liquid, this is problematic, particularly for continuous processes, as a "non-wetting" reaction liquid would not easily spread over the immiscible liquid surface as the growing three-dimensional product or "build" is moved upward as polymerization proceeds. Additionally as large parts (x and y direction) are made the ability of the polymerizable liquid to flow or "spread" over the immiscible liquid (and preferably form a continuous film or layer on top of the immiscible liquid, and not form beads, droplets, or other discontinuous regions) is particularly important. Hence it is preferable that the immiscible liquid is sufficiently "wettable" with the polymerizable liquid so that the polymerizable liquid can enter, or flow into, the polymerization zone as the polymerized liquid, or growing build object, is moved vertically.

The property of "wetting", "wettability" or "wettable" is generally defined with reference to the "contact angle" formed when one liquid is placed on top of another (liquid or solid; in the present case liquid) surface. A contact angle of zero degrees indicates perfectly wetting properties; a contact angle between zero and ninety degrees generally indicates high wetting properties; a contact angle between ninety and one hundred and eighty degrees generally indicates low wetting properties; a contact angle of 180 degrees indicates perfectly non-wetting properties. It is not required that perfect wetting be achieved, and some lower wettability combinations may be satisfactory in some circumstances (e.g., where a deep layer of polymerizable liquid is deposited on top of a sufficiently deep pool of immiscible liquid), but it is generally preferred that the contact angle between the polymerizable liquid and immiscible liquid, during the irradiating steps, be less than 150, 120, or 90 degrees be achieved. If such wettability is not inherently achieved by the particular combination of polymerizable liquid and immiscible liquid, wettability between the two liquids can be increased by the inclusion of one or more wetting agents in either or both of the liquids, as discussed further below.

It should be noted that contact angles are generally defined for solid-liquid interfaces with limited references to liquid-liquid interfaces. Thus wetting is usually defined for a combination of a solid and a liquid. Wetting can be defined for immiscible liquid mixtures using the spreading coefficient. For the case of liquid B spreading over liquid A the relevant equation is:

$$S_{B/A} = \gamma_A - \gamma_B - \gamma_{AB}$$

where:
S is the spreading coefficient,
$\gamma_A$ is the surface tension of liquid A,
$\gamma_B$ is the surface tension of liquid B and
$\gamma_{AB}$ is the interfacial tension between A and B.

If the spreading coefficient is greater than zero, liquid B will spontaneously spread over liquid A. Note the value of the reverse spreading coefficient $S_{A/B}$ will be different than $S_{B/A}$. Hydrocarbons such as benzene, isopentane, hexane have positive spreading coefficients over water initially but under equilibrium conditions negative values are observed. This results in a lens of a large droplet of the hydrocarbon on the water surface. As more hydrocarbon is added, this lens will spread out a form a continuous layer over water. The spreading of oil from an oil spill into water to form an oil "slick" has been widely studied. In this case "spreading" does not mean that the spreading coefficient is positive. The "lens" can be employed to determine the contact angle. From the tangent line to the water surface at the point of contact of the lens (where water, lens and air exist) and the tangent line of the oil surface also at the point of contact, the contact angle can be defined from the intersection of these tangent lines. The contact angle is defined as the angle between these lines which comprises the liquid lens space. If the contact angle is too large and the spreading coefficient is too negative, the flow of liquid B (in this case the polymerizable liquid) into a narrow gap over liquid A resulting from vertical displacement of the part will be more difficult. For a perfectly or highly non-wettable immiscible liquid surface, dewetting may occur in the polymerization zone as the part is moved vertically creating voids. Thus for the purposes of this invention, some level of wetting is required. Also for the purposes of this invention the terms "spreading" and "spreads" does not mean the spreading coefficient is positive but rather that the polymerizable liquid has the capability of flowing or spreading over the surface of the immiscible liquid in the zone of polymerization to replenish the polymerizable liquid region.

Density Enhancing.

Aqueous liquids are preferred for the immiscible liquid in many embodiments. However, as water has a density of 1.0 g/cm³, it does not have a density high enough to be more dense than many potential polymerizable liquids. A denser form of water known in the art as heavy water (deuterium oxide; D₂O) only has a density of about 1.11 g/cm³ and may not be sufficient for many desirable polymerizable liquids. Hence, to increase the density of water, one or more salts can be added to the aqueous liquid to form salt solutions thereof. These solutions preferably maintain transparency up to their solubility limit and be reasonably transparent to UV at 365 nm (a preferred UV wavelength) as a thin film layer. As examples, water with 25 wt % NaCl has a density of 1.193 g/cm³; Dead Sea water has a density is 1.240 g/cm³. The density of various salts that may be used, singly or in any combination thereof, and their solubility limit in water is listed in the Table below:

| Salt | Salt density (anhydrous) g/cc | Solubility limit in water around room temperature |
|---|---|---|
| NaCl | 2.165 | 35.9 g/100 ml |
| NaBr | 3.21 | 90.5 g/100 ml |
| KBr | 2.74 | 67.8 g/100 ml |
| MgBr₂ | 3.72 | 102 g/100 ml |
| MgCl₂ | 2.32 | 54.3 g/100 ml |
| Sodium acetate | 1.528 | 46.4 g/100 ml |
| Sodium nitrate | 2.257 | 91.2 g/100 ml |
| CaBr₂ | 3.353 | 143 g/100 ml |
| CaCl₂ | 2.15 | 74.5 g/100 ml |
| Na₂CO₃ | 2.54 | 21.5 g/100 ml |
| NH₄Br | 2.429 | 78.3 g/100 ml |
| LiBr | 3.464 | 166.7 g/100 ml |

Viscosity.

Soluble organic compounds can also be added to aqueous (and nonaqueous) immiscible liquids to increase the density, increase the viscosity (syrup-like), and modify the wetting characteristics to reaction systems. These mixtures can be modified with salt as discussed above to increase the density and optionally water soluble polymers (discussed below) to further increase the viscosity of the immiscible liquid.

| Organic compound | Density (anhydrous) g/cc | Solubility in water around room temperature |
|---|---|---|
| glycerol | 1.261 | |
| glucose | 1.54 | 90.0 g/100 ml |
| fructose | 1.694 | |
| sucrose | 1.587 | 200 g/100 ml |
| maltose | 1.54 | 108 g/100 ml |
| Ethylene glycol | 1.1132 | soluble |
| Triethylene glycol | 1.1255 | soluble |
| Diethylene glycol | 1.118 | soluble |
| Glutaric acid | 1.429 | >50% |

In some embodiments viscosity mismatch between the immiscible liquid and the polymerizable liquid may be a problem. In this case, water soluble polymers can be added to water (and the water solutions discussed above) to increase the viscosity. Examples of suitable polymers include but are not limited to poly(ethylene oxide), poly (vinyl pyrrolidone), poly(acrylic acid), poly(methacrylic acid) poly(ethyl oxazoline), poly(ethylene imine), poly(vinyl amine), carboxy methyl cellulose, and the like. A specific case where extremely high viscosities may be desired would involve a hydrogel layer on glass. In this case a lightly crosslinked water soluble polymer (like poly(acrylic acid)) can be attached to glass and saturated with water. Indeed, in some embodiments this condition may not require a higher density than the reaction system and may allow a stable layer that resists adhesion of the polymerized reaction system, allowing easy removal of the three dimensional object from the apparatus.

Wetting Agents.

Modification of the wetting properties can be accomplished by addition of a surfactant to the immiscible liquid and/or the polymerizable liquid. In the case of addition of a surfactant to the liquid layer comprised of water and water solutions as discussed above a litany of potential surfactants can be considered. A surfactant in this case lowers the interfacial tension between the two layers. These include nonionic, anionic and cationic surfactants. Examples include, but not limited to: sodium stearate, sodium lauryl sulfate, sodium dodecyl benzene sulfonate, dioctadecyldimethylammonium chloride, octaethylene glycol monododecyl ether, poly(propylene glycol)-poly(ethylene glycol) block copolymers, polyoxyethylene glycol octylphenol ethers, polyethoxylated tallow amines. Classes of these compounds include linear alkylbenzene sulfonates, fatty alcohol ethyoxylates, alkylphenol ethoxylates, and lignin sulfonates. Silicone surfactants and fluorocarbon surfactants are also well known and can be used in this process.

Reactive oligomers such as polyethylene glycol ("PEG") diacrylates could be a problem with water as the liquid layer due to the affinity of the PEG oligomer for water. Polypropylene glycol ("PPG") diacrylates and poly(tetramethylene oxide) diacrylates do not have a affinity for water and are also lower in density than the analogous PEG diacrylates. Reactive diluents such as styrene and acrylate monomers can be added to decrease the viscosity of the reaction system.

Nonaqueous Immiscible Liquids.

Although aqueous liquids are preferred for the immiscible liquid, in some embodiments preferred, nonaqueous liquid layers may be preferable for specific reaction systems. Examples include higher density hydrocarbon liquids such as ethylene glycol, diethylene glycol, triethylene glycol, glycerol, formamide, fluorocarbons and perfluorcarbon liquids such as Kytox (duPont) or Fomblin perfluorinated polyether oil. Low toxicity chlorinated aliphatic hydrocarbon liquids could also be considered. Nonaqueous liquid salts (also referred to as ionic liquids) can also be employed, examples of which include but are not limited to 1-butyl-3, 5-dimethylpyridinium bromide and 1-butyl-3-methylimidazolium hexafluorophosphate.

Liquid Systems.

The polymerizable liquid and the immiscible liquid described above, can be combined in situ in an apparatus to form a liquid system as described herein, or can be packaged together in a suitable container, in any suitable ratio or amount as described above, for storage, shipping, and subsequent use.

4. Methods.

Once the polymerizable liquid and the immiscible liquid are supplied together in a suitable apparatus and a sufficiently stable interface between the two liquids is formed, fabrication of the three dimensional object may commence. As noted above, fabrication may be carried out layer-by-layer or continuously, though continuous fabrication, achieved by establishing a gradient of polymerization as shown in FIG. 1 above through adjustment of rate of advance, irradiation intensity, etc., is preferred.

While the dead zone (when present) and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or said gradient of polymerization zone and said dead zone together have a thickness of from 1 or 2 microns up to 400, 600, or 1000 microns, or more. Thus the gradient of polymerization zone (whether contacting a dead zone, or an immiscible liquid) may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

In some embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.).

In other embodiments of the invention, the advancing step is carried out continuously, at a uniform or variable rate. Note that fabrication of the product may be continuous (as opposed to layer-by-layer) even when the advancing step is carried out in increments.

In some embodiments, the rate of advance (whether carried out sequentially or continuously) is from about 0.11, or 10 microns per second, up to about to 100, 1,000, or 10,000 microns per second, again depending again depending on factors such as temperature, pressure, structure of the article being produced, intensity of radiation, etc.

In some embodiments the filling step is carried out by forcing said polymerizable liquid into said build region under pressure. In such a case, the advancing step or steps may be carried out at a rate or cumulative or average rate of at least 0.1, 1, 10, 50, 100, 500 or 1000 microns per second, or more. In general, the pressure may be whatever is sufficient to increase the rate of said advancing step(s) at least 2, 4, 6, 8 or 10 times as compared to the maximum rate of repetition of said advancing steps in the absence of said pressure. Where the pressure is provided by enclosing an apparatus such as described above in a pressure vessel and carrying the process out in a pressurized atmosphere (e.g., of air, air enriched with nitrogen, a blend of gases, etc.) a pressure of 10, 20, 30 or 40 pounds per square inch (PSI) up to, 200, 300, 400 or 500 PSI or more, may be used. For fabrication of large irregular objects higher pressures may be less preferred as compared to slower fabrication times due to the cost of a large high pressure vessel.

On the other hand, when smaller items are fabricated, or a rod or fiber is fabricated that can be removed or exited from the pressure vessel as it is produced through a port or orifice therein, then the size of the pressure vessel can be kept smaller relative to the size of the product being fabricated and higher pressures can (if desired) be more readily utilized.

As noted above, the irradiating step is in some embodiments carried out with patterned irradiation. The patterned irradiation may be a fixed pattern or may be a variable pattern created by a pattern generator (e.g., a DLP) as discussed above, depending upon the particular item being fabricated.

When the patterned irradiation is a variable pattern rather than a pattern that is held constant over time, then each irradiating step may be any suitable time or duration depending on factors such as the intensity of the irradiation, the presence or absence of dyes in the polymerizable material, the rate of growth, etc. Thus in some embodiments each irradiating step can be from 0.001, 0.01, 0.1, 1 or 10 microseconds, up to 1, 10, or 100 minutes, or more, in duration. The interval between each irradiating step is in some embodiments preferably as brief as possible, e.g., from 0.001, 0.01, 0.1, or 1 microseconds up to 0.1, 1, or 10 seconds.

The methods and apparatus of the invention can include process steps and apparatus features to implement process control, including feedback and feed-forward control, to, for example, enhance the speed and/or reliability of the method.

A controller for use in carrying out the present invention may be implemented as hardware circuitry, software, or a combination thereof. In one embodiment, the controller is a general purpose computer that runs software, operatively associated with monitors, drives, pumps, and other components through suitable interface hardware and/or software. Suitable software for the control of a three-dimensional printing or fabrication method and apparatus as described herein includes, but is not limited to, the ReplicatorG open source 3d printing program, 3DPrint™ controller software from 3D systems, Slic3r, Skeinforge, KISSlicer, Repetier-Host, PrintRun, Cura, etc., including combinations thereof.

Process parameters to directly or indirectly monitor, continuously or intermittently, during the process (e.g., during one, some or all of said filling, irradiating and advancing steps) include, but are not limited to, irradiation intensity, temperature of carrier, polymerizable liquid in the build zone, temperature of growing product, temperature of immiscible liquid, pressure, speed of advance, pressure, strain (e.g., exerted on the carrier by the growing product being fabricated), thickness of release layer, etc.

Known parameters that may be used in feedback and/or feed-forward control systems include, but are not limited to, expected consumption of polymerizable liquid (e.g., from the known geometry or volume of the article being fabricated), degradation temperature of the polymer being formed from the polymerizable liquid, etc.

Process conditions to directly or indirectly control, continuously or step-wise, in response to a monitored parameter, and/or known parameters (e.g., during any or all of the process steps noted above), include, but are not limited to, rate of supply of polymerizable liquid, temperature, pressure, rate or speed of advance of carrier, intensity of irradiation, duration of irradiation (e.g. for each "slice"), etc.

For example, the temperature of the polymerizable liquid in the build zone, or the temperature of the immiscible liquid, can be monitored, directly or indirectly with an appropriate thermocouple, non-contact temperature sensor (e.g., an infrared temperature sensor), or other suitable temperature sensor, to determine whether the temperature exceeds the degradation temperature of the polymerized product. If so, a process parameter may be adjusted through a controller to reduce the temperature in the build zone and/or of the immiscible liquid. Suitable process parameters for such adjustment may include: decreasing temperature with a cooler, decreasing the rate of advance of the carrier, decreasing intensity of the irradiation, decreasing duration of radiation exposure, etc.

In addition, the intensity of the irradiation source (e.g., an ultraviolet light source such as a mercury lamp) may be monitored with a photodetector to detect a decrease of intensity from the irriadiation source (e.g., through routine degredation thereof during use). If detected, a process parameter may be adjusted through a controller to accommodate the loss of intensity. Suitable process parameters for such adjustment may include: increasing temperature with a heater, decreasing the rate of advance of the carrier, increasing power to the light source, etc.

As another example, control of temperature and/or pressure to enhance fabrication time may be achieved with heaters and coolers (individually, or in combination with one another and separately responsive to a controller), and/or with a pressure supply (e.g., pump, pressure vessel, valves and combinations thereof) and/or a pressure release mechanism such as a controllable valve (individually, or in combination with one another and separately responsive to a controller).

In some embodiments the controller is configured to maintain the gradient of polymerization zone/active surface described herein (see, e.g., FIG. 1) throughout the fabrication of some or all of the final product. The specific configuration (e.g., times, rate or speed of advancing, radiation intensity, temperature, etc.) will depend upon factors such as the nature of the specific polymerizable liquid and the product being created. Configuration to maintain the gradient of polymerization zone/active surface may be carried out empirically, by entering a set of process parameters or instructions previously determined, or determined through a series of test runs or "trial and error"; configuration may be provided through pre-determined instructions; configuration may be achieved by suitable monitoring and feedback (as discussed above), combinations thereof, or in any other suitable manner.

5. Fabrication Products.

Three-dimensional products produced by the methods and processes of the present invention may be final, finished or substantially finished products, or may be intermediate products subject to further manufacturing steps such as surface treatment, laser cutting, electric discharge machining, etc., is intended. Intermediate products include products for which further additive manufacturing, in the same or a different apparatus, may be carried out). For example, a fault or cleavage line may be introduced deliberately into an ongoing "build" by disrupting, and then reinstating, the gradient of polymerization zone/active surface, to terminate one region of the finished product, or simply because a particular region of the finished product or "build" is less fragile than others.

Numerous different products can be made by the methods and apparatus of the present invention, including both large-scale models or prototypes, small custom products, miniature or microminiature products or devices, etc. Examples include, but are not limited to, medical devices and implantable medical devices such as stents, drug delivery depots, functional structures, microneedle arrays, fibers and rods such as waveguides, micromechanical devices, microfluidic devices, etc.

Thus in some embodiments the product can have a height of from 0.1 or 1 millimeters up to 10 or 100 millimeters, or more, and/or a maximum width of from 0.1 or 1 millimeters up to 10 or 100 millimeters, or more. In other embodiments, the product can have a height of from 10 or 100 nanometers up to 10 or 100 microns, or more, and/or a maximum width of from 10 or 100 nanometers up to 10 or 100 microns, or more. These are examples only: Maximum size and width depends on the architecture of the particular device and the resolution of the light source and can be adjusted depending upon the particular goal of the embodiment or article being fabricated.

In some embodiments, the ratio of height to width of the product is at least 2:1, 10:1, 50:1, or 100:1, or more, or a width to height ratio of 1:1, 10:1, 50:1, or 100:1, or more.

In some embodiments, the product has at least one, or a plurality of, pores or channels formed therein, as discussed further below.

The processes described herein can produce products with a variety of different properties. Hence in some embodiments the products are rigid; in other embodiments the products are flexible or resilient. In some embodiments, the products are a solid; in other embodiments, the products are a gel such as a hydrogel. In some embodiments, the products have a shape memory (that is, return substantially to a previous shape after being deformed, so long as they are not deformed to the point of structural failure). In some embodiments, the products are unitary (that is, formed of a single polymerizable liquid); in some embodiments, the products are composites (that is, formed of two or more different polymerizable liquids). Particular properties will be determined by factors such as the choice of polymerizable liquid(s) employed.

In some embodiments, the product or article made has at least one overhanging feature (or "overhang"), such as a bridging element between two supporting bodies, or a cantilevered element projecting from one substantially vertical support body. Because of the unidirectional, continuous nature of some embodiments of the present processes, the problem of fault or cleavage lines that form between layers when each layer is polymerized to substantial completion and a substantial time interval occurs before the next pattern is exposed, is substantially reduced. Hence, in some embodiments the methods are particularly advantageous in reducing, or eliminating, the number of support structures for such overhangs that are fabricated concurrently with the article.

The foregoing is illustrative of the present invention, and is not to be construed as limiting thereof. The invention is defined by the following claims, with equivalents of the claims to be included therein.

That which is claimed is:

1. A method of forming a three-dimensional object, comprising the steps of:
    providing a carrier and a pool of immiscible liquid, said pool having a liquid build surface, said carrier and said liquid build surface defining a build region therebetween;
    filling said build region with a polymerizable liquid, wherein said immiscible liquid is immiscible with said polymerizable liquid,
    irradiating said build region through at least a portion of said pool of immiscible liquid to form a solid polymer from said polymerizable liquid and advancing said carrier away from said liquid build surface to form said three-dimensional object comprised of said solid polymer,
    wherein said irradiating step is carried out under conditions in which said immiscible liquid is wettable with said polymerizable liquid,
    and wherein said immiscible liquid further comprises a viscosity-enhancing agent.

2. The method of claim 1, wherein said immiscible liquid is a single phase solution.

3. The method of claim 1, wherein said immiscible liquid is an aqueous liquid.

4. The method of claim 1, wherein said immiscible liquid has a density of at least 1.13 grams per cubic centimeter.

5. The method of claim 1, wherein said irradiating step is carried out under conditions in which the viscosity of said polymerizable liquid is not greater than the viscosity of said immiscible liquid.

6. The method of claim 1, wherein either or both of said immiscible liquid and said polymerizable liquid further comprises a wetting agent.

7. The method of claim 1, further comprising the step of cooling said pool.

8. The method of claim 7, wherein said pool is at least partially frozen.

9. The method of claim 1, further comprising the step of heating said pool.

10. The method of claim 1, wherein said pool is supported by a window, and said irradiating step is carried out by irradiating through said window.

11. The method of claim 1, wherein the volume of said pool of immiscible liquid is the same during the formation of the three-dimensional object.

12. The method of claim 1, wherein said viscosity-enhancing agent comprises glycerol, glucose, fructose, sucrose, maltose, ethylene glycol, triethylene glycol, diethylene glycol, or glutaric acid.

13. A method of forming a three-dimensional object, comprising the steps of:
    providing a carrier and a pool of immiscible liquid, said pool having a liquid build surface, said carrier and said liquid build surface defining a build region therebetween;
    filling said build region with a polymerizable liquid, wherein said immiscible liquid is immiscible with said polymerizable liquid,
    irradiating said build region through at least a portion of said pool of immiscible liquid to form a solid polymer from said polymerizable liquid and advancing said carrier away from said liquid build surface to form said three-dimensional object comprised of said solid polymer,
    wherein said irradiating step is carried out under conditions in which said immiscible liquid is wettable with said polymerizable liquid,
    wherein said immiscible liquid further comprises a viscosity-enhancing agent, and
    wherein said viscosity-enhancing agent comprises a water soluble polymer.

14. The method of claim 13, wherein the water soluble polymer comprises poly(ethylene oxide), poly(vinyl pyrrolidone), poly(acrylic acid), poly(methacrylic acid), poly(ethyl oxazoline), poly(ethylene imine), poly(vinyl amine), or carboxy methyl cellulose.

15. The method of claim 13, wherein either or both of said immiscible liquid and said polymerizable liquid further comprises a wetting agent.

16. The method of claim 15, wherein the wetting agent comprises a nonionic, anionic or cationic surfactant.

17. The method of claim 13, wherein said pool is supported by a window, and said irradiating step is carried out by irradiating through said window.

* * * * *